United States Patent [19]

Popat et al.

[11] Patent Number: 5,407,718
[45] Date of Patent: Apr. 18, 1995

[54] TRANSPARENT PAPER LABEL SHEETS

[75] Inventors: Ghanshyam H. Popat, Alta Loma; Susan C. Manfreda, Los Angeles, both of Calif.

[73] Assignee: Avery Dennison Corporation, Pasadena, Calif.

[21] Appl. No.: 102,459

[22] Filed: Aug. 5, 1993

[51] Int. Cl.[6] .................................................. C09J 7/02
[52] U.S. Cl. ...................................... 428/42; 428/337; 428/339; 428/343; 428/918
[58] Field of Search .................... 428/40, 42, 343, 918, 428/332, 337, 339

[56] References Cited

U.S. PATENT DOCUMENTS

| | | |
|---|---|---|
| 3,600,270 | 8/1971 | Schoeller, Jr. |
| 4,121,003 | 10/1978 | Williams . |
| 4,137,046 | 1/1979 | Koike et al. . |
| 4,569,888 | 2/1986 | Muller .............................. 428/481 |
| 4,763,930 | 8/1988 | Matney . |
| 4,863,537 | 9/1989 | Sadri .................................. 428/343 |
| 4,980,212 | 12/1990 | Marquis et al. . |
| 5,275,868 | 1/1994 | Popat .................................. 428/343 |

Primary Examiner—Jenna L. Davis
Attorney, Agent, or Firm—Poms, Smith, Lande & Rose

[57] ABSTRACT

A label sheet assembly for transparent paper labels has a substantially transparent paper label sheet with a substantially transparent, pressure sensitive adhesive coating. Labels are die cut out of the paper label sheet. The paper label sheet is mounted on a backing sheet, which has a release coating to allow removal of the labels. The pressure sensitive adhesive may be stable in the presence of temperatures up to 200 degrees Fahrenheit so that the labels may be printed in a laser printer. The label sheet assembly may be printed in its entirety by an ink jet printer or xerographic printer with a resulting high print quality. A method for printing transparent label sheet assemblies comprises forming double thickness label sheet assemblies, creating a paper supply, feeding label sheet assemblies from the paper supply through xerographic and ink jet printers, removing labels from a backing sheet, and applying the labels to products to be labeled. By using transparent paper labels, this method allows a single source of transparent label sheet assemblies to supply a variety of different printers, including ink jet, and xerographic printers.

18 Claims, 1 Drawing Sheet

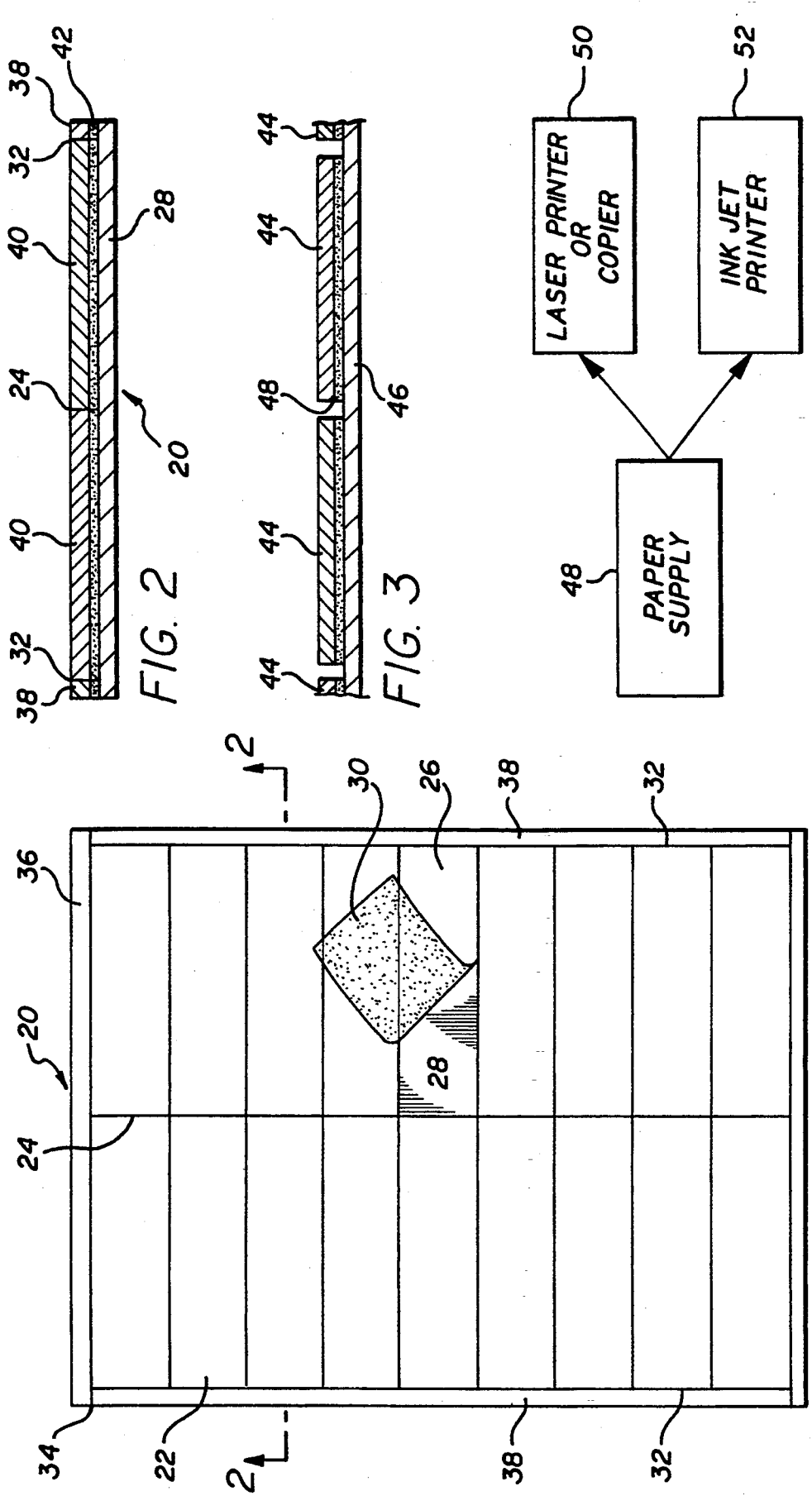

TRANSPARENT PAPER LABEL SHEETS

FIELD OF THE INVENTION

The present invention relates generally to substantially transparent paper labels, and to a method for using a single supply of such labels for printing with ink jet and xerographic printers.

BACKGROUND OF THE INVENTION

The personal computer revolution has provided the average computer owner with new capabilities for printing labels. Labels can be designed with a simple word processor, then printed out onto sheets of blank labels using an ink jet or laser printer. If the computer owner desires a large number of labels, a single printed sheet of labels may be xeroxed onto sheets of blank labels.

A significant problem with such blank labels arises when they are used to address large numbers of fine stationary envelopes. Typical labels utilize a stark white background to provide high contrast to black ink. Consequently, such labels detract from high-quality, colored backgrounds such as are typically found on textured paper envelopes. The stark white background of the address label creates a cheap, mass produced appearance.

One failed attempt to solve the problem employs clear plastic labels made of mylar. Although these labels reveal the color and texture of the paper underneath, the mylar material is entirely deficient as a printing surface. Many modern printers are of the ink jet variety, whereby a tiny jet of ink is sprayed onto a surface to form an image. A mylar surface, however, does not absorb the ink but merely causes the ink to bead up. Consequently, the print is poorly defined and smudges easily. Although the mylar labels may be provided with an ink-absorbing coating, the coating is expensive and is not economically feasible.

SUMMARY OF THE INVENTION

The present invention has four important objects. The first object is to provide clear labels which facilitate high-quality printing from a variety of printers, including ink jet printers. The second object is to provide clear labels that do not require a special coating to facilitate printing with ink jet printers. A third object is to provide clear labels having a clear adhesive so as not to interfere with light transmission through the label. A fourth object is to provide a method for printing transparent paper label sheet assemblies so that a single supply of labels may be used with a variety of standard paper printers.

Generally stated, a label assembly that satisfies the first three of these objects has a backing layer with a release coating. Substantially transparent paper labels provided with a pressure sensitive adhesive coating are mounted onto the backing layer. The adhesive layer abuts the release coating so that a user can easily remove the labels from the backing layer.

One specific embodiment of this type of label assembly employs a pressure sensitive adhesive that is stable in the presence of temperatures up to 200 degrees Fahrenheit. This temperature stability ensures that the adhesive will not flow out of the label assembly in the heated environment of a laser printer. The adhesive should be substantially transparent to maintain the transparency of the labels.

The label sheet assembly may also be provided with die cut lines along the top, bottom, and sides to create flexible edges. These edges help prevent jamming in complex printer paths, such as those found in laser printers. Additionally, the label sheet may be provided with lines of perforation which divide the sheet into sections. When a user wishes to print a small number of labels, she may tear a section of labels from the sheet. She then prints the smaller number of labels by feeding the section into a printer.

A method for printing transparent paper labels includes a number of steps. Double thickness label sheet assemblies are formed, each having substantially transparent paper labels mounted thereon. A user then forms a paper supply that includes a stack of the label sheet assemblies. From this paper supply, the user feeds label sheet assemblies through xerographic and ink jet printers. The user removes printed labels from the backing sheets and applies the labels to a product to be labeled. This method enables the user to utilize a single supply of transparent labels in conjunction with a variety of standard paper printers, such as ink jet and xerographic printers.

As is apparent from the foregoing description, the present transparent paper label assembly and the associated method for printing such labels readily satisfy the objects of the invention. The transparent paper labels provide a printing surface that facilitates high-quality printing from a variety of printers, including ink jet printers. The paper labels do not require an expensive coating to facilitate printing with ink jet printers. Furthermore, the clear adhesive does not interfere with light transmission through the transparent labels. Additionally, the present method for printing transparent paper label sheet assemblies enables a user to purchase a single supply of transparent labels for use with a variety of different printers.

Other objects, features, and advantages of the invention will become apparent from a consideration of the following detailed description and the accompanying drawings.

BRIEF DESCRIPTION OF THE DRAWINGS

FIG. 1 is a front elevational view showing a sheet of transparent paper labels on a backing sheet, with one of the transparent labels partially removed from the backing sheet;

FIG. 2 is a sectional view taken along section 2—2 of FIG. 1 showing the die-cut transparent paper labels adhering to the backing sheet;

FIG. 3 is a sectional view of a label strip showing transparent paper labels adhering to a continuous backing strip;

FIG. 4 is a block diagram illustrating that a single supply of transparent paper labels may be used with ink jet printers, laser printers, or xerographic printers.

DETAILED DESCRIPTION OF THE PREFERRED EMBODIMENTS

Referring more particularly to the drawings, FIG. 1 illustrates a presently preferred embodiment of a transparent paper label sheet. The label sheet 20 includes numerous clear labels 22 which are formed by die cuts 24. Clear label 26 is shown partially removed from backing layer 28. Each label is provided with an adhesive layer 30 which permits the user to apply the label to another surface. Additional die cuts 32 and 34 may be provided to form flexible edges 36 and 38, which facilitate ease of feeding into complex printer paths, such as those found on laser printers.

FIG. 2 is a cross-sectional view taken along section 2—2 of FIG. 1. FIG. 2 shows that label assembly 20 includes a label layer 40 having pressure sensitive adhesive coating 42. Label layer 40 is mounted onto backing layer 28 by means of adhesive coating 42. This backing layer has a silicone release coating to permit easy removal of the mounted labels from the backing layer. The release coating may alternately be fluorinated or amine-based, rather than silicone, or may be any other suitable coating.

FIG. 2 also shows die cuts 32 and 24. As FIG. 2 reveals, the die cuts extend through label layer 40 and through adhesive layer 42, but do not pierce backing layer 28. Consequently, backing layer 28 remains intact as the clear labels are removed one by one, allowing the labels to be conveniently stored on the full sheet when only a few labels are left.

Adhesive layer 42 has two important characteristics. First, the adhesive must be able to withstand the high heat levels generated inside a xerographic printer, such as a laser printer. Unless the adhesive coating is temperature stable, the adhesive will soften and ooze out from behind the labels. The softened adhesive could then foul the interior of the printer and could damage the printing surface of the labels themselves. Consequently, the adhesive coating should be stable in the presence of temperatures up to about 200° F.

The second important characteristic of adhesive layer 42 involves the clarity of the adhesive. Since the labels 22 are clear, adhesive layer 42 must also be clear. Otherwise, the adhesive will absorb light that would normally pass through clear label layer 40. Two temperature stable, clear adhesives suitable for use with the present transparent paper label assemblies are the Nicolmelt P-1834 and L-2274 adhesives, which are manufactured by Malcolm Nicol & Co., Inc. In addition to these specific adhesives, any other adhesive that is temperature-stable and clear may be used. It should be noted that many clear adhesives are acrylic based, although other types of clear adhesives can be found.

With regard to clear label layer 22, these labels should be formed out of a suitable transparent paper. As mentioned previously, existing clear labels are typically made out of non-absorbent mylar, which produces poor print quality with ink jet printers. A suitable transparent paper, on the other hand, has the benefit of allowing light to pass through the label, while at the same time being sufficiently absorbent to permit high print quality.

Those skilled in the art are aware that one measure of paper transparency is known as the 89% reflective backing opacity, or contrast ratio ($C_{0.89}$). This contrast ratio, which is expressed as a percentage, is defined by the following formula:

$$C_{0.89} = 100(R_0/R_{0.89}).$$

In the foregoing formula, $R_0$ represents the diffuse reflectance of a specimen backed by a black body of 0.5% reflectance or less. $R_{0.89}$ represents the diffuse reflectance of the same specimen backed by a white body having an absolute reflectance of 0.89. Accordingly, the contrast ratio $C_{0.89}$ is 100% for perfectly opaque paper and is only a few percent for perfectly transparent sheets. The contrast ratio can be measured by standard testing equipment such as the MacBeth 1500/Plus Color Measurement System.

Paper that is sufficiently transparent for the present transparent paper label assemblies should have a contrast ratio of between 30% to 40%, although the contrast ratio can be even lower. The combination of the paper and the adhesive backing must also be sufficiently transparent, preferably having a contrast ratio of between 40% to 45% or less. For purposes of comparison, typical bond paper for photocopiers has an contrast ratio of between 85% and 95%. Clear plastic sheets, such as those for overhead projector transparencies, typically have a contrast ratio of between 15% and 20%. Suitable transparent papers are commercially available. One such paper is Gateway Natural Tracing Paper, manufactured by Chartham Paper Mill, Canterbury, Kent, England.

It should be noted that these paper-based transparent labels enable a user to print labels in any of a variety of different printers with resulting high quality of print. Because the labels are transparent, printing thereon appears to have been printed directly on the surface to which the labels have been applied. It should be further noted that the present clear labels may be applied to surfaces other than paper. For instance, a user may want to apply clear labels to other clear surfaces, such as display cases, mirrors, or optical glasses.

The present clear paper labels may be provided in numerous formats. FIG. 3 is a cross-sectional view of continuous strips of paper labels. Individual paper labels 44 are mounted upon a continuous backing strip 46 by means of adhesive layer 48. These label strips may be stored in large rolls and dispensed by hand-held or automated label dispensers. Individual labels 44 may be separated from backing layer 46, either by means of a peeling blade, or by hand. The labels may be printed by any type of printer adapted for printing label strips.

FIG. 4 illustrates yet another advantage of the present clear paper labels. A single supply of these labels 48 may be used in a wide variety of printers. Among the printers for which the present labels are suitable are xerographic printers 50, such as laser printers and copiers, and the very popular ink jet printers 52. This advantage should be particularly appealing to users who have a variety of printers at their disposal. Such users may now purchase a single supply of clear paper labels for use in any of the printers that they have.

A method for printing high-quality transparent paper labels of the type of the present invention includes the following steps. First, a double thickness transparent paper label assembly is formed. The paper label assembly has a sheet of substantially transparent paper labels mounted on a backing sheet. The backing sheet is coated with a release layer for easy removal of the labels. A high temperature resistant pressure sensitive adhesive is provided between the label sheet and the release coated backing sheet.

Next, a user forms a paper supply that includes a stack of the double thickness label sheet assemblies. The user then feeds at least one paper label assembly from the paper supply through a xerographic printer. Alternately, the user feeds at least one paper label assembly from the paper supply through an ink jet printer. The user removes the printed labels from the backing sheet and applies the printed label to products to be labeled. This method permits a user to utilize a single supply of transparent label sheet assemblies to produce high quality printed labels from a variety of different printers, including ink jet and xerographic printers.

By way of example and not of limitation, the embodiment of FIG. 1 may have the following dimensions. Label sheet 20 may be a standard 8½×11 inch sheet. Edge portions 36 and 38 may be one-half inch wide. Each label 22 may be one inch high by 4 inches long. Of course, the label sheets may be provided in dimensions other than 8½×11 inches. For instance, sheets may be provided in smaller dimensions of 4¼×5½ inches in legal sized sheets, or various other sizes.

In conclusion, it is to be understood that the foregoing detailed description and the accompanying drawings relate to preferred embodiments of the invention. Various changes and modifications may be made without departing from the spirit and scope of the invention. Thus, by way of example and not of limitation, the clear paper labels may be arranged in any configuration on a backing sheet. For instance, three rows of labels may be provided on a sheet, rather than two, as shown in FIG. 1. Similarly, the label assemblies may be provided without flexible edges 36 and 38. Additionally, lines of perforation may be added to or used instead of die cut lines 34 and 32 to create the flexible edges. Lines of perforation may also be used to separate columns of labels so that columns of labels may be individually separated from the label sheet.

Other variations are also apparent. Circular, triangular, octagonal, and any other shape labels may be cut into the label sheet. Furthermore, lines of perforation may be provided in a full-sized sheet, such that the full-sized sheet may be subdivided into smaller sections. Each of these sections may then be removed from the larger sheet and run through a printer individually. Die cut lines may be provided along an edge of each of the sections to provide flexibility for feeding each section into a printer. This type of divisible transparent paper label sheet arrangement allows a user to print a smaller number of labels when a small number of labels is desired, thereby reducing wasted labels when only a few labels are desired.

Additionally, the labels of the present invention need not be entirely transparent, but may instead be slightly tinted for decorative effect. For example, a substantially transparent paper label may be given a slight reddish tint, so that when used on a blue envelope, the section of the envelope underneath the label will appear to be purple. Similarly, other color combinations can be imagined. The labels may also be provided with preprinted patterns for additional decorative effect.

Accordingly, the present invention is not limited to the specific embodiments shown in the drawings and described in the detailed description.

What is claimed is:

1. A label sheet assembly for transparent labels comprising:
    a backing sheet having a release coating;
    a substantially transparent paper label sheet having a substantially transparent, pressure sensitive adhesive coating thereon mounted on said backing sheet, with the adhesive abutting said release coating of said backing sheet;
    said substantially transparent paper label sheet having a contrast ratio of less than approximately 30%;
    said pressure sensitive adhesive being stable in the presence of temperatures up to 200 degrees Fahrenheit; and
    said label sheet having a plurality of die cut labels thereon, with the die cuts extending through the label sheet but not the backing sheet; and
    said assembly further comprising a die cut line of flexibility extending across at least the major portion of at least one side of said assembly, said die cut line of flexibility being inset from and substantially parallel to an edge of said assembly, said die cut line of flexibility extending through said transparent paper label sheet but not through said backing sheet;
    wherein the contrast ratio of the combination of said label sheet and said adhesive is less than approximately 45%;
    whereby said label sheet assembly may be printed in its entirety by an ink jet printer or xerographic printer with a resulting high print quality.

2. A label sheet assembly as defined in claim 1 wherein said label sheet assembly is 8½ inches wide by 11 inches long.

3. A label sheet assembly for transparent labels comprising:
    a backing sheet having a release coating;
    a substantially transparent paper label sheet having a substantially transparent, pressure sensitive adhesive coating thereon mounted on said backing sheet, with the adhesive abutting said release coating of said backing sheet;
    said pressure sensitive adhesive being stable in the presence of temperatures up to 200 degrees Fahrenheit; and
    said label sheet having a plurality of die cut labels thereon, with the die cuts extending through the label sheet but not the backing sheet;
    wherein the contrast ratio of said paper label sheet and said adhesive coating in combination is no greater than 45%;
    whereby said label sheet assembly may be printed in its entirety by an ink jet printer or xerographic printer with a resulting high print quality.

4. A label sheet assembly as defined in claim 3, wherein said assembly is separated into sections by at least one line of perforations which extends through both said backing sheet and said paper label sheet and which divides said assembly into separable sections which can be individually detached from said assembly and fed into a xerographic or ink jet printer.

5. A label sheet assembly as defined in claim 3, wherein said assembly further comprises die cut lines along the top, bottom, and sides of said assembly to provide said assembly with flexibility for feeding said assembly into a laser printer without jamming in the printer.

6. A label sheet assembly as defined in claim 5, wherein said die cut lines extend through said label sheet but not through said backing sheet.

7. A label sheet assembly as defined in claim 3, wherein said label sheet assembly further comprises lines of perforations along an edge of each of said sections to provide flexibility for feeding said section into a printer.

8. A label sheet assembly as defined in claim 5, wherein said label sheet assembly further comprises die cut lines through said label sheet, along an edge of each of said sections, to provide flexibility for feeding said section into a printer.

9. A label sheet assembly as defined in claim 3, wherein said substantially transparent adhesive is an acrylic adhesive.

10. A label sheet assembly as defined in claim 3, wherein the contrast ratio of the combination of said label sheet and said adhesive is less than approximately 40%.

11. A label sheet assembly as defined in claim 3, wherein said label sheet assembly is no greater than 4¼ inches wide by 5½ inches long.

12. A label assembly for transparent labels comprising:
a backing layer having a release coating;
substantially transparent paper labels having a clear, pressure sensitive adhesive coating thereon mounted on said backing layer, with the adhesive abutting said release coating of said backing layer;
each of said paper labels comprising a paper label body having a contrast ratio of between 30% and 40%; and
said paper label body and said adhesive coating together having a contrast ratio of between 40% and 45%;
whereby the color and texture of a substrate onto which said labels are applied can be clearly seen through said labels in areas of said labels which have no printing.

13. A label assembly as defined in claim 12, wherein said adhesive coating is stable in the presence of temperatures up to 200 degrees Fahrenheit.

14. A label assembly as defined in claim 12, wherein said adhesive is an acrylic adhesive.

15. A label assembly as defined in claim 12, wherein said backing layer is a substantially continuous strip, said label assembly being stored in a roll, whereby said roll may be incrementally unrolled to dispense individual labels.

16. A label sheet assembly as defined in claim 1, wherein said assembly is no more than 4¼ inches wide by 5½ inches long.

17. A label sheet assembly as defined in claim 1, wherein said adhesive coating has sufficient strength so that said labels will adhere to a paper envelope without falling off in normal use.

18. A label sheet assembly for transparent labels for addressing envelopes comprising:
a backing sheet having a release coating;
a substantially transparent paper label sheet having a substantially transparent, pressure sensitive adhesive coating on one side thereof, said paper label sheet being mounted on said backing sheet with the adhesive coating abutting said release coating of said backing sheet;
said substantially transparent paper label sheet having a contrast ratio no greater than 40%;
said adhesive being stable in the presence of temperatures up to 200 degrees Fahrenheit;
said label sheets having a plurality of die cut labels thereon, with the die cuts extending through the label sheet but not through the backing sheet;
said adhesive coating having sufficient adhesive strength so that each of said labels will not easily dismount from an envelope when mounted on the envelope;
said label sheet assembly having at least one line of perforations which divides said assembly into smaller sections, each of said sections being individually separable from said assembly for individual feeding into a xerographic, laser or ink jet printer;
wherein the contrast ratio of the paper label sheet in combination with the adhesive coating is no greater than 45%;
whereby each of said labels may be affixed to an envelope to address the envelope prior to mailing, with the portions of the label that do not have printing allowing the texture and color of the envelope to show through the label.

* * * * *

REEXAMINATION CERTIFICATE (3744th)
United States Patent [19]
Popat et al.

[11] B1 5,407,718
[45] Certificate Issued Mar. 2, 1999

[54] TRANSPARENT PAPER LABEL SHEETS

[75] Inventors: Ghanshyam H. Popat, Alta Loma; Susan C. Manfreda, Los Angeles, both of Calif.

[73] Assignee: Avery Dennison Corporation, Pasadena, Calif.

Reexamination Requests:
No. 90/004,478, Dec. 6, 1996
No. 90/004,762, Sep. 26, 1997

Reexamination Certificate for:
Patent No.: 5,407,718
Issued: Apr. 18, 1995
Appl. No.: 102,459
Filed: Aug. 5, 1993

[51] Int. Cl.$^6$ ............................................. C09J 7/02
[52] U.S. Cl. ............................ 428/41.5; 347/105; 428/337; 428/339; 428/343; 428/918
[58] Field of Search ............................ 428/41.7, 41.8, 428/42.3, 43, 220, 332, 337, 339, 343, 918, 906, 41.5; 347/105

[56] References Cited

U.S. PATENT DOCUMENTS

| | | |
|---|---|---|
| 3,827,808 | 8/1974 | Cho . |
| 3,972,788 | 8/1976 | Pekko et al. . |
| 4,569,888 | 2/1986 | Muller et al. . |
| 4,763,930 | 8/1988 | Matney . |
| 4,863,537 | 9/1989 | Sadri . |
| 5,132,915 | 7/1992 | Goodman . |
| 5,135,261 | 8/1992 | Cusak et al. . |
| 5,230,938 | 7/1993 | Hess et al. ............................ 428/42.3 |
| 5,340,427 | 8/1994 | Cusack et al. ............................ 156/268 |

FOREIGN PATENT DOCUMENTS

9304943  3/1993  WIPO .

OTHER PUBLICATIONS

Judd, Deane B., "Optical Specification of Light–Scattering Materials", vol. 19, Sep. 1937, Part of Journal of Research of National Bureau of Standards.

Britt, Kenneth W., "Handbook of Pulp and Paper Technology", Second Edition, 1970.

Scott et al, William E., "Properties of Paper: An Introduction", Second Edition, 1989 and 1995.

Avery packaging of product code 5662 for clear mylar labels, copyright 1990.

Chartham Papers *Newswire*, Mar. 1992, p. 3 (Exh. 1 of Request for Reexam).

*Laser Run Brochure*, Published prior to Aug. 5, 1992 (Exh. 2 of Request for Reexam).

Printed Packaging for Avery Product No. 5267, "Laser Printer Labels", Copyright date 1990 (Exh. 3 of Request for Reexam).

National Business Forms Assn. book entitled *Labels*, Published in or about 1983, pp. ix, 9–12 (Exh. 4 of Request for Reexam).

(List continued on next page.)

*Primary Examiner*—Jenna Davis

[57] ABSTRACT

A label sheet assembly for transparent paper labels has a substantially transparent paper label sheet with a substantially transparent, pressure sensitive adhesive coating. Labels are die cut out of the paper label sheet. The paper label sheet is mounted on a backing sheet, which has a release coating to allow removal of the labels. The pressure sensitive adhesive may be stable in the presence of temperatures up to 200 degrees Fahrenheit so that the labels may be printed in a laser printer. The label sheet assembly may be printed in its entirety by an ink jet printer or xerographic printer with a resulting high print quality. A method for printing transparent label sheet assemblies comprises forming double thickness label sheet assemblies, creating a paper supply, feeding label sheet assemblies from the paper supply through xerographic and ink jet printers, removing labels from a backing sheet, and applying the labels to products to be labeled. By using transparent paper labels, this method allows a single source of transparent label sheet assemblies to supply a variety of different printers, including ink jet, and xerographic printers.

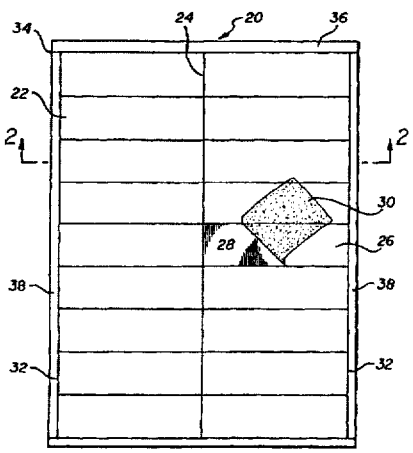

OTHER PUBLICATIONS

*Z–Label 1988 Office Products Catalog* (Exh 5 of Request for Reexam).

Samuel Jones & Co. Ltd. *Price List*, Apr. 1960 (Exh. 8 of Request for Reexam).

Chartham Papers *Newswire*, Dec. 1991, p. 2 (Exh. 9 of Request for Reexam).

Chartham Papers *Newswire*, Autumn 1992, p. 2 (Exh. 9 of Request for Reexam).

Chartham Papers *Newswire*, Spring 1993, pp. 2, 3, and 6 (Exh. 9 of Request for Reexam).

Chartham Papers *Newswire*, Autumn 1993, p. 3 (Exh. 9 of Request for Reexam).

REEXAMINATION CERTIFICATE
ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–18 is confirmed.

* * * * *